(12) United States Patent
Otsuki et al.

(10) Patent No.: US 12,062,006 B2
(45) Date of Patent: Aug. 13, 2024

(54) DELIVERY METHOD, DELIVERY MANAGEMENT SERVER, AND MOBILE BODY

(71) Applicant: TOYOTA JIDOSHA KABUSHIKI KAISHA, Toyota (JP)

(72) Inventors: Nobuhisa Otsuki, Toyota (JP); Haeyeon Lee, Tokyo-to (JP); Kunihiro Iwamoto, Nagakute (JP); Kota Oishi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/732,689

(22) Filed: Apr. 29, 2022

(65) Prior Publication Data

US 2022/0366364 A1    Nov. 17, 2022

(30) Foreign Application Priority Data

May 14, 2021   (JP) ................. 2021-082636

(51) Int. Cl.
*G06Q 10/0832*  (2023.01)
*G05D 1/00*     (2024.01)
*G06Q 10/0833*  (2023.01)

(52) U.S. Cl.
CPC ....... *G06Q 10/0832* (2013.01); *G05D 1/0217* (2013.01); *G05D 1/0289* (2013.01); *G06Q 10/0833* (2013.01)

(58) Field of Classification Search
CPC .......... G06Q 10/0832; G06Q 10/0833; G05D 1/0217; G05D 1/0289
See application file for complete search history.

(56) References Cited

U.S. PATENT DOCUMENTS

| | | | |
|---|---|---|---|
| 2019/0220819 A1* | 7/2019 | Banvait | G06Q 10/0832 |
| 2020/0070717 A1* | 3/2020 | Garden | G06V 20/56 |
| 2021/0009160 A1* | 1/2021 | Hauser | B60W 60/0015 |
| 2021/0020052 A1* | 1/2021 | Nagai | B64C 39/02 |
| 2021/0125146 A1* | 4/2021 | Tazume | B64D 1/08 |
| 2021/0339952 A1* | 11/2021 | Ganguli | G06Q 10/0836 |
| 2022/0147921 A1* | 5/2022 | Kanata | G06Q 50/30 |

FOREIGN PATENT DOCUMENTS

| | | |
|---|---|---|
| JP | 2002-170138 A | 6/2002 |
| JP | 2005-242489 A | 9/2005 |
| JP | 6164599 B1 | 7/2017 |

OTHER PUBLICATIONS

Li, A mechanism for scheduling multi robot intelligent warehouse system face with dynamic demand, p. 470-473 (Year: 2018).*

* cited by examiner

*Primary Examiner* — Ibrahim N El-Bathy
(74) *Attorney, Agent, or Firm* — Sughrue Mion, PLLC

(57) ABSTRACT

A delivery method according to the present disclosure includes a step of delivering packages to designated destinations by mobile bodies traveling autonomously, each of the packages having a delivery priority level. The delivery method further includes a step of, when a number of mobile bodies gathered in a bottleneck section is larger than a number of mobile bodies capable of passing through the bottleneck section at the same time, preferentially causing a mobile body delivering a package of which the delivery priority level is higher than a package delivered by another mobile body to pass through the bottleneck section.

20 Claims, 9 Drawing Sheets

| Delivery robot ID No. | Delivery priority level |
|---|---|
| 1 | 4 |
| 2 | 2 |
| 3 | 0 |
| 4 | 8 |
| ⋮ | ⋮ |
| i-1 | 5 |
| i | 1 |
| i+1 | 10 |
| ⋮ | ⋮ |
| N-1 | 3 |
| N | 0 |

Fig.5

DELIVERY METHOD, DELIVERY MANAGEMENT SERVER, AND MOBILE BODY

CROSS-REFERENCE TO RELATED APPLICATION

The present application claims priority under 35 U.S.C. § 119 to Japanese Patent Application No. 2021-082636, filed May 14, 2021, the contents of which application are incorporated herein by reference in their entirety.

BACKGROUND

Field

The present disclosure relates to a technique for delivering a package to a designated destination by a mobile body traveling autonomously.

Background Art

JP6164599B discloses a prior art for delivering a package by a mobile body traveling autonomously to a home delivery box put in a parking lot.

Traveling routes for a mobile body delivering a package include a place where it is difficult to move freely due to interference with other mobile bodies such as a narrow road and an indoor corridor, where two-way traffic is impossible, and an elevator that have a limited number of passengers on board. However, the above prior art has not considered the behavior to be taken by the mobile body in such a place.

SUMMARY

The present disclosure has been made in view of the above-described problems. An object of the present disclosure is to provide a technique capable of reducing a disadvantage caused by a delay in delivery while controlling traffic in a bottleneck section in which congestion of mobile bodies delivering a package occurs.

The present disclosure provides a delivery method. The delivery method according to the present disclosure comprises delivering packages to designated destinations by mobile bodies traveling autonomously, each of the packages having a delivery priority level. Furthermore, the delivery method according to the present disclosure comprises, when a number of mobile bodies gathered in a bottleneck section is larger than a number of mobile bodies capable of passing through the bottleneck section at the same time, preferentially causing a mobile body delivering a package of which the delivery priority level is higher than a package delivered by another mobile body to pass through the bottleneck section.

By preferentially causing the mobile body delivering a package of which the delivery priority level is high to pass through the bottleneck section, a disadvantage caused by a delay in delivery can be reduced while controlling traffic in the bottleneck section.

The delivery method according to the present disclosure may further comprise changing the delivery priority level of a package depending on a staying time of a mobile body delivering the package in the bottleneck section. Comprising this feature makes it possible to suppress the occurrence of a situation in which one mobile body stays long in the bottleneck section.

The delivery method according to the present disclosure may further comprise changing the delivery priority level of a package over time depending on a content of the package. Comprising this feature makes it possible to reduce a delay in delivery of the package whose value depends on delivery time.

The delivery method according to the present disclosure may further comprise changing the delivery priority level of a package depending on a time remaining until a reserved delivery time of the package. Comprising this feature makes it possible to reduce a delay in delivery of the package with respect to the reserved delivery time.

The delivery method according to the present disclosure may further comprise changing the delivery priority level of a package depending on a scheduled stay period of a resident in a destination to which the package is delivered. Comprising this feature makes it possible to deliver the package within the period in which the resident stays at the destination.

The delivery method according to the present disclosure may further comprise changing the delivery priority level of a package depending on a scheduled return home time of a resident in a destination to which the package is delivered. Comprising this feature makes it possible to deliver the package matching the time when the resident returns to the destination.

The delivery method according to the present disclosure may further comprise changing the delivery priority level of a package depending on an elapsed time from departure of a mobile body delivering the package from a delivery source. Comprising this feature makes it possible to suppress the occurrence of a situation in which a long period of time has elapsed since the package was dispatched, and the package further wastes time in the bottleneck section.

The delivery method according to the present disclosure may further comprise changing the delivery priority level of a package depending on an elapsed time from an order from a resident in a destination to which the package is delivered. Comprising this feature makes it possible to suppress an increase in dissatisfaction of the resident who ordered delivery of the package due to an increase in waiting time.

The delivery method according to the present disclosure may further comprise, when there is no difference in delivery priority levels of packages among the mobile bodies gathered in the bottleneck section, requesting remote assistance from an operator to determine an order of passing through the bottleneck section. Comprising this feature makes it possible to prevent the mobile bodies from freezing and failing to operate in front of the bottleneck section because the order of the mobile bodies passing through the bottleneck section is determined by the remote assistance by the operator.

The present disclosure provides a delivery management server. The delivery management server according to the present disclosure is a server that is connected via a communication network to a plurality of mobile bodies traveling autonomously and delivering packages to designated destinations. The delivery management server according to the present disclosure comprises one or more memories storing a delivery priority level of each of the packages and one or more processors controlling behavior of the plurality of mobile bodies. The one or more processors are configured to, when a number of mobile bodies gathered in a bottleneck section is larger than a number of mobile bodies capable of passing through the bottleneck section at the same time, preferentially cause a mobile body delivering a package of which the delivery priority level is higher than a package delivered by another mobile body to pass through the bottleneck section.

In the delivery management server according to the present disclosure, the one or more processors may be configured further to change the delivery priority level of a package depending on a residence time of a mobile body delivering the package in the bottleneck section. The one or more processors may be configured further to change the delivery priority level of a package over time depending on a content of the package. The one or more processors may be configured further to change the delivery priority level of a package depending on a time remaining until a reserved delivery time of the package. The one or more processors may be configured further to change the delivery priority level of a package depending on a scheduled stay period of a resident in a destination to which the package is delivered. The one or more processors are configured further to change the delivery priority level of a package depending on a scheduled return home time of a resident in a destination to which the package is delivered. The one or more processors may be configured further to change the delivery priority level of a package depending on an elapsed time from departure of a mobile body delivering the package from a delivery source. The one or more processors may be configured further to change the delivery priority level of a package depending on an elapsed time from an order from a resident in a destination to which the package is delivered. Further, the one or more processors may be configured further to, when there is no difference in delivery priority levels of packages among the mobile bodies gathered in the bottleneck section, requesting remote assistance from an operator to determine an order of passing through the bottleneck section.

Also, the present disclosure provides a program. The program according to the present disclosure is a program that causes a computer to control the behavior of a plurality of mobile bodies traveling autonomously and delivering packages to designated destinations. The program according to the present disclosure causes a computer to, when a number of mobile bodies gathered in a bottleneck section is larger than a number of mobile bodies capable of passing through the bottleneck section at the same time, preferentially cause a mobile body delivering a package of which the delivery priority level is higher than a package delivered by another mobile body to pass through the bottleneck section. The program according to the present disclosure may be recorded on a non-transitory computer-readable storage medium.

The present disclosure also provides a mobile body. The mobile body according to the present disclosure is a mobile body configured to travel autonomously and deliver a package to a designated destination. The mobile body according to the present disclosure comprises a memory storing a delivery priority level of the package, and a processor controlling behavior of the mobile body. The processor is configured to, when a number of mobile bodies including the mobile body gathered in a bottleneck section is larger than a number of mobile bodies capable of passing through the bottleneck section at the same time, compare the priority level of the package between the mobile bodies gathered in the bottleneck section. The processor is configured to cause the mobile body to pass through the bottleneck section prior to one or more other mobile bodies delivering packages having lower priority levels than the mobile body after one or more other mobile bodies delivering packages having higher priority levels than the mobile body have passed the bottleneck section.

As described above, according to the technique according to the present disclosure, by preferentially causing a mobile body delivering a package having a high delivery priority level to pass through the bottleneck section, it is possible to reduce a disadvantage caused by a delay in delivery while controlling traffic in the bottleneck section.

BRIEF DESCRIPTION OF THE DRAWINGS

FIG. 5 is a diagram illustrating an example of a table for managing a delivery priority level of a package.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures that are described in the embodiments shown as follows are not always indispensable to the disclosure unless specially explicitly shown otherwise, or unless the disclosure is explicitly designated by the structures or the steps theoretically.

1. First Embodiment 1-1. Configuration of Delivery System

Figure 1:
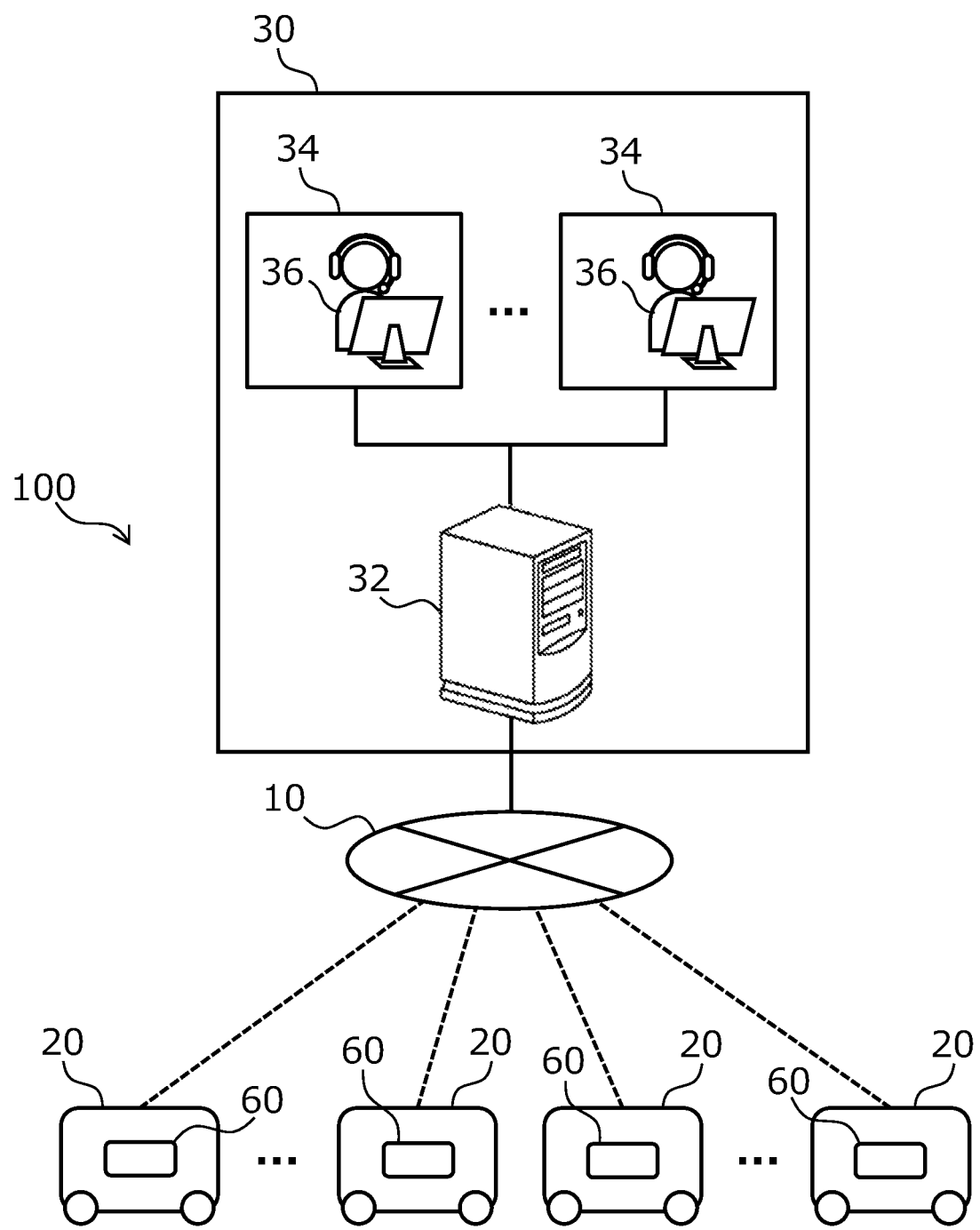
FIG. 1 is a diagram illustrating a configuration of a delivery system according to a first embodiment of the present disclosure.

FIG. 1 is a diagram illustrating a configuration of a delivery system according to a first embodiment of the present disclosure. The delivery system 100 is a system for delivering packages 60 using delivery robots 20. The delivery robot 20 is a small mobile body capable of autonomous traveling. The delivery robot 20 is configured with, for example, a carriage having a plurality of wheels and a container for housing a package 60. There is no limitation on the type of package 60 to be delivered by the delivery system 100, as long as delivery by the delivery robot 20 is physically possible and legally acceptable. For example, various articles such as sundry goods, foods, liquors, books, electrical appliances, dishes, and the like can be delivered as a package 60. If the container of the delivery robot 20 is provided with a heat insulation function, it is also possible to deliver refrigerated and frozen foods or warm cooking.

The delivery system 100 operates a plurality of delivery robots 20. All the delivery robots 20 are connected to a delivery management server 32 via a communication network 10 including 4G and 5G. The delivery management server 32 is, for example, installed in the monitoring center 30 for monitoring the operation status of the delivery robots 20. A plurality of operators 36 work at the monitoring center 30. The operators 36 monitor the operation status of the delivery robots 20 in the monitoring terminals 34. If necessary, the operators 36 can also perform remote support to the delivery robots 20 by operating the monitoring terminals 34.

Figure 2:
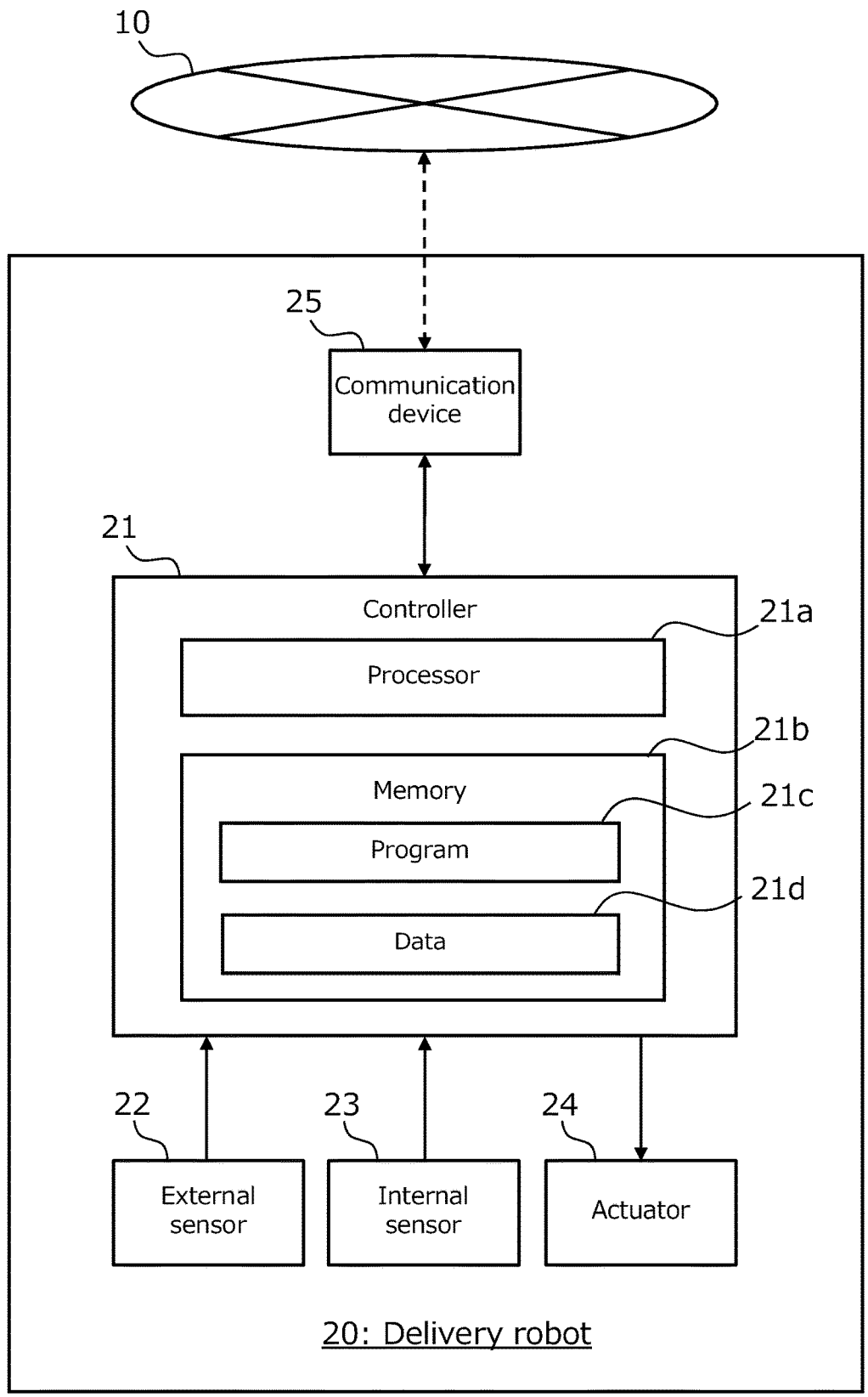
FIG. 2 is a block diagram illustrating an example of a configuration of a delivery robot.

FIG. 2 is a block diagram illustrating an example of a configuration of the delivery robot 20. The delivery robot 20 includes a controller 21. The controller 21 is a set of a plurality of ECUs (Electronic Control Unit) mounted on the delivery robot 20. The delivery robot 20 also includes an external sensor 22, an internal sensor 23, an actuator 24, and a communication device 25. These are connected to the controller 21.

The controller 21 includes one or more processors 21a (hereinafter, simply referred to as a processor 21a) and one or more memories 21b (hereinafter, simply referred to as a memory 21b) coupled to the processor 21a. The memory 21b stores one or more programs 21c (hereinafter, simply referred to as a program 21c) executable by the processor 21a and various related data 21d.

When the processor 21a executes the program 21c, various kinds of processing performed by the processor 21a are realized. The program 21c includes, for example, a program for causing the delivery robot 20 to travel autonomously. The data 21d includes, for example, map data used in autonomous traveling. The memory 21b includes a non-transitory computer-readable storage medium that includes a main storage device and an auxiliary storage device. The program 21c may be stored in the main storage device or may be stored in the auxiliary storage device.

The external sensor 22 includes a perception sensor that acquires information for perceiving surrounding conditions of the delivery robot 20. The perception sensor includes a camera for photographing surroundings of the delivery robot 20, particularly in front of the delivery robot 20. Examples of the perception sensor other than the camera include a LiDAR (Laser Imaging Detection and Ranging) and a millimeter-wave radar. The external sensor 22 also includes a location sensor for detecting the location and orientation of the delivery robot 20. As the location sensor, a Global Positioning System (GPS) sensor is exemplified. Information acquired by the external sensor 22 is transmitted to the controller 21.

The inner sensor 23 includes a state sensor that acquires information about the motion of the delivery robot 20. As the state sensor, for example, a wheel speed sensor, an acceleration sensor, an angular velocity sensor, and a steering angle sensor are exemplified. The acceleration sensor and the angular velocity sensor may constitute an IMU. Information acquired by the internal sensor 23 is transmitted to the controller 21. The information acquired by the inner sensor 23 and the information acquired by the external sensor 22 are used as information for autonomous traveling.

The actuator 24 includes a steering device for steering the delivery robot 20, a driving device for driving the delivery robot 20, and a braking device for braking the delivery robot 20. The actuator 24 may be, for example, an electric motor provided for each wheel. In this case, the steering, the driving, and the braking of the delivery robot 20 can be realized by independently controlling the rotation of each wheel of the delivery robot 20. That is, the electric motor as the actuator 24 may function as the steering device, the driving device, and the braking device. The actuator 24 operates by a control signal transmitted from the controller 21.

The communication device 25 is a device for controlling wireless communication with the outside of the delivery robot 20. The communication device 25 communicates with the delivery management server 32 via the communication network 10. Information processed by the controller 21 is transmitted to the delivery management server 32 using the communication device 25. The information transmitted to the delivery management server 32 includes monitoring information for monitoring the operation status of the delivery robot 20. The monitoring information includes, in addition to the information acquired by the external sensor 22 and the internal sensor 23, information acquired by calculation by the autonomous traveling program (e.g., target trajectory). Information processed by the delivery management server 32 is taken into the controller 21 using the communication device 25. Also, when vehicle-to-vehicle communication with other delivery robots or road-to-vehicle communication with infrastructure facilities is required, communication with those external devices is also performed by the communication device 25.

Figure 3:
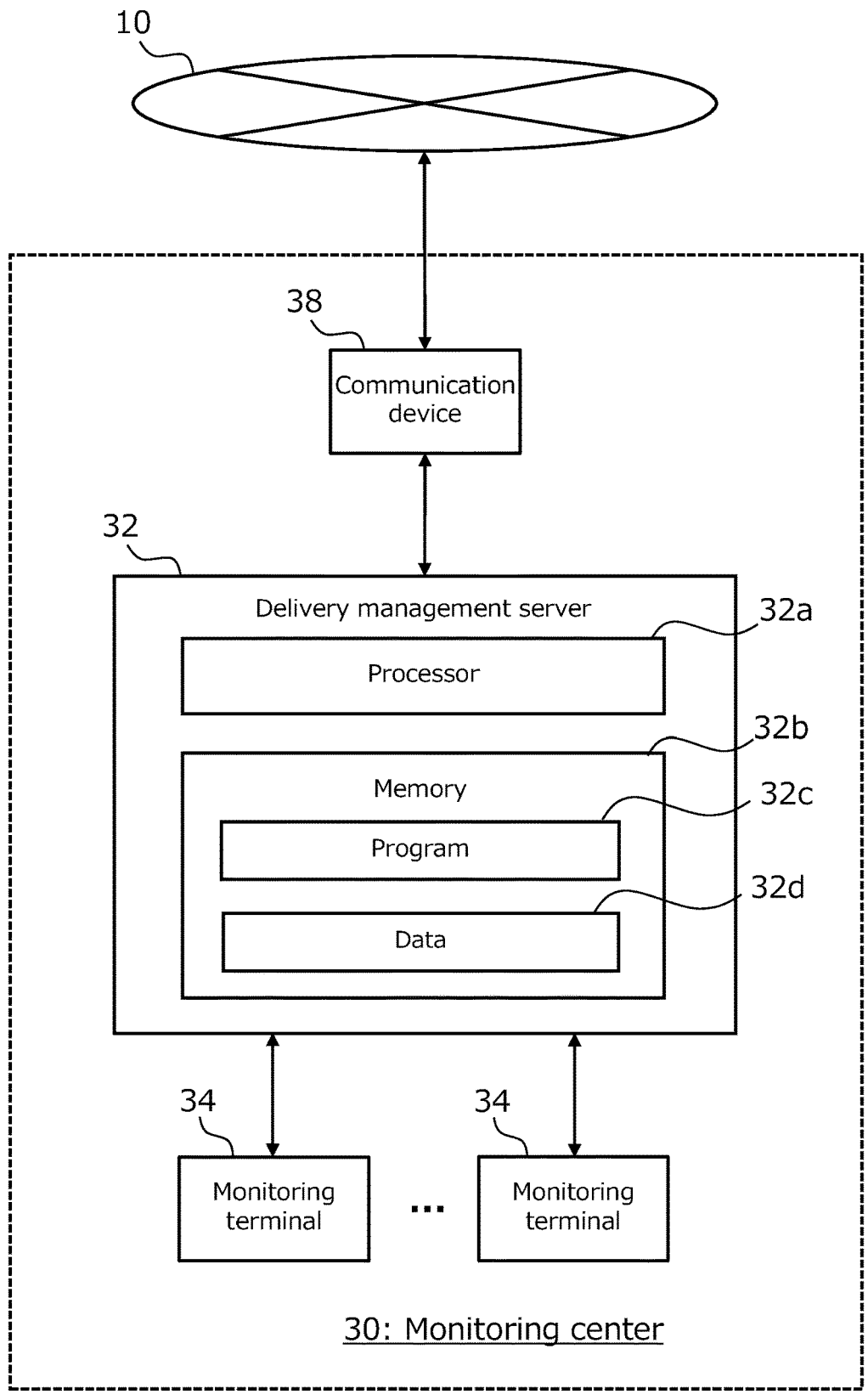
FIG. 3 is a block diagram illustrating an example of a configuration of a delivery management server.

FIG. 3 is a block diagram illustrating an example of a configuration of the delivery management server 32. The delivery management server 32 is installed in the monitoring center 30 together with the monitoring terminals 34 and a communication device 38. The communication device 38 is a device for controlling communication with the outside of the monitoring center 30. The communication device 38 mediates communication between the delivery management server 32 and the delivery robots 20 performed via the communication network 10. Information processed by the delivery management server 32 is transmitted to the delivery robot 20 using the communication device 38. Information processed by the delivery robot 20 is taken into the delivery management server 32 using the communication device 38.

The delivery management server 32 may be a computer or a set of computers connected via a communication network. The delivery management server 32 includes one or more processors 32a (hereinafter, simply referred to as a processor 32a) and one or more memories 32b (hereinafter, simply referred to as a memory 32b) coupled to the processor 32a. The memory 32b stores one or more programs 32c (hereinafter, simply referred to as a program 32c) executable by the processor 32a and various related data 32d.

When the processor 32a executes the program 32c, various kinds of processing performed by the processor 32a are realized. The program 32c includes an arbitration program for arbitration to be described later. The data 32d includes a delivery priority level of a package to be described later. The memory 32b includes a non-transitory computer-readable storage medium that includes a main storage device and an auxiliary storage device. The program 32c may be stored in the main storage device or may be stored in the auxiliary storage device.

The monitoring terminal 34 includes a display. The display can display the operation status of all the delivery robots 20, and can also display the operation status of a particular delivery robot 20. Additionally, the display may display an image photographed by the camera of the particular delivery robot 20. The monitoring terminal 34 includes an input device for remote support of the delivery robot 20 by the operator 36. As a specific example of the input device, a button, a lever, and a touch panel may be exemplified.

1-2. Operation of Package Delivery by Delivery System

Next, the operation of the package delivery by the delivery system 100 according to the first embodiment will be described with reference to FIG. 4. The delivery system 100 is a system that delivers a package using a delivery robot from a delivery source to a designated destination. In the example shown in FIG. 4, a delivery center 52, a restaurant 54, and a shop 56 are exemplified as delivery sources. Also, as destinations, a dwelling unit 44A on the second floor of a condominium 40, a dwelling unit 44B on the third floor of the condominium 40, and a detached house 48 are illustrated.

In the delivery system 100, the delivery of a package is performed upon receiving an order from a user. The operation of the order is performed, for example, on a PC website or a smartphone application, and the order is transmitted to the delivery management server 32. Order Information includes the article ID, the number of articles to be ordered, the address of the destination, and the phone number of the user. In addition, the order information may include desired delivery time (reserved delivery time) and receivable period (scheduled stay period of the user in the destination). If the user is away from home, scheduled return home time may be included in the order information. The delivery management server 32 extracts only the information necessary for delivery of the article from the information included in the order information from the user, and transmits as a delivery instruction to the delivery source.

Figure 4:
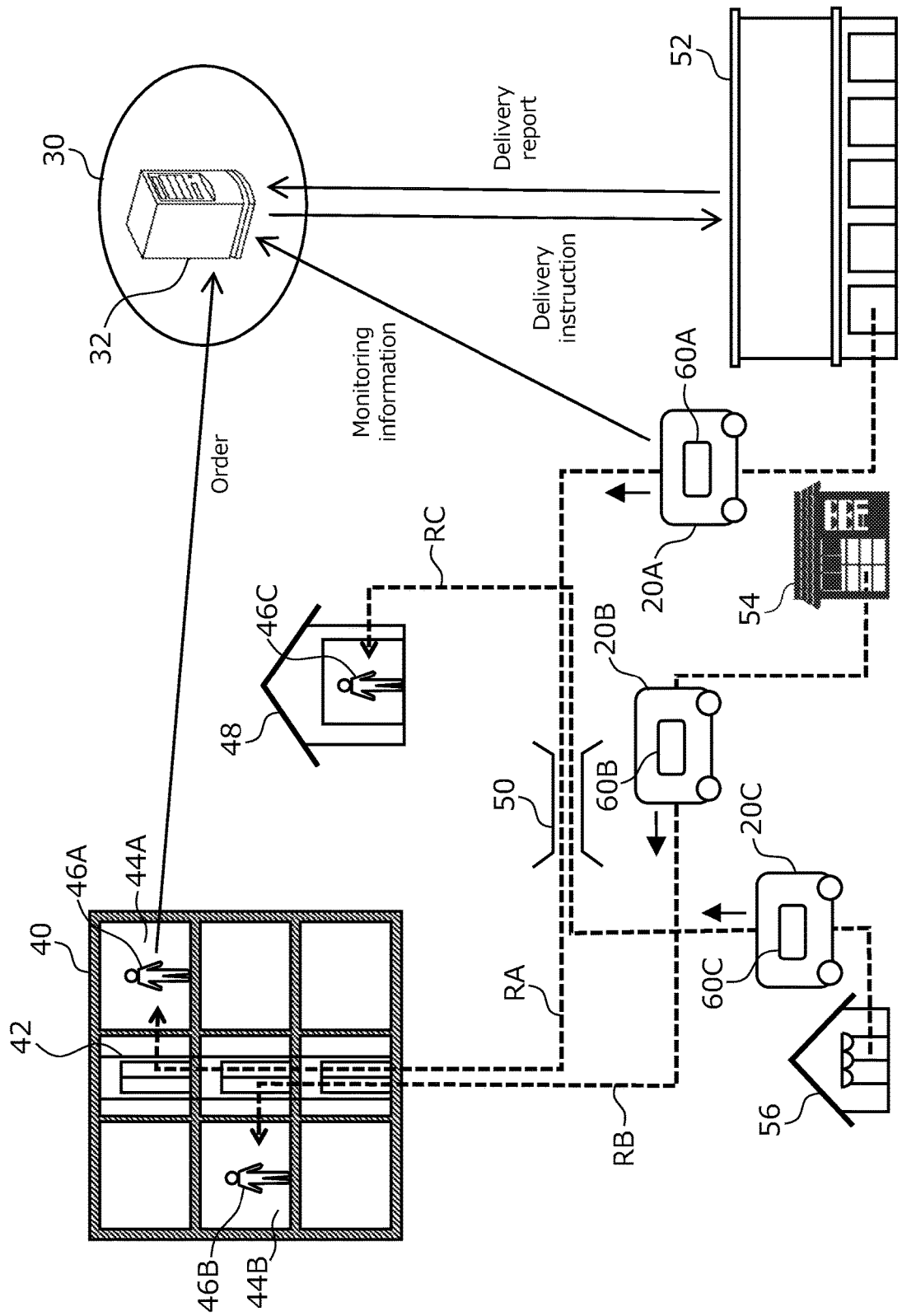
FIG. 4 is a diagram for explaining the operation of package delivery by the delivery system according to the first embodiment of the present disclosure.

In the example shown in FIG. 4, the delivery management server 32 receives an order of an article from a resident 46A of the dwelling unit 44A on the second floor of the condominium 40, transmits a delivery instruction to the delivery source to deliver the ordered article to the designated dwelling unit 44A. In the example shown in FIG. 4, the delivery source is a delivery center 52 that handles the ordered article. In the delivery center 52, the ordered article is deposited as a package 60A to the delivery robot 20A responsible for delivery. Then, a delivery report is transmitted from the delivery center 52 to the delivery management server 32. The delivery report includes the time when the delivery robot 20A departed the delivery center 52.

The delivery robot 20A loaded with the package 60A generates a traveling route RA from the delivery center 52 to the dwelling unit 44A of the condominium 40 which is the destination, based on the map data stored in the memory 21b. Then, the delivery robot 20A autonomously travels along the traveling route RA while generating target trajectories to avoid obstacles detected by the perception sensor. While moving by autonomous traveling, the delivery robot 20A continuously transmits the monitoring information to the delivery management server 32.

In the example shown in FIG. 4, the delivery robots 20B, 20C deliver the packages 60B, 60C during the same period as the delivery robot 20A. In reality, many delivery robots 20 deliver various packages 60 during the same time period, where the delivery robots 20 are represented by the delivery robots 20A, 20B, 20C and the packages 60 are represented by the packages 60A, 60B, 60C.

The delivery robot 20B delivers to the dwelling unit 44B from the restaurant 54 the package 60B ordered from a resident 46B of the dwelling unit 44B on the third floor of the condominium 40. The package 60B delivered from the restaurant 54 is, specifically, the delivery of ramen noodles, soba noodles, sushi, pizza, etc. The delivery robot 20C also delivers the package 60C ordered from a resident 46C of the detached house 48 from the shops 56 to the resident 46C. The delivery robots 20B, 20C each autonomously travels along traveling routes RB, RC and continuously transmits monitoring information to the delivery management server 32 while moving by autonomous traveling.

The respective delivery robots 20A, 20B, 20C generate the optimum traveling routes RA, RB, RC based on the map data. However, since the travelable area on the map is limited, the traveling routes naturally overlap. Even if the traveling routes overlap, there will be no problem if the location is such that many delivery robots can pass through at the same time, such as on a wide road. However, a problem may occur when the travel routes overlap in a bottleneck section where the number of delivery robots that can pass through at the same time is limited.

In the example shown in FIG. 4, the traveling routes RA, RB of the delivery robots 20A, 20B include an elevator 42 of the condominium 40. The elevator 42 may be an elevator for cargo, or may be an elevator for both human use and cargo. There is a limit to the number of delivery robots that can ride in the elevator 42 at the same time. The delivery robots that could not ride in the elevator 42 have to wait for the elevator 42 to come back. There is a large difference in waiting time for the delivery robots according to the order of riding in the elevator 42. Therefore, the elevator 42 falls into the bottleneck section. When the delivery robots 20A, 20B arrive at the condominium 40 at the same time, the problem arises which of the delivery robots 20A, 20B will first ride in the elevator 42.

Further, in the exemplary embodiment shown in FIG. 4, a narrow road 50 is included in the traveling route RA, RC of the delivery robot 20A,20C. The narrow road 50 falls into the bottleneck section, because the delivery robot can only pass one by one alternately in the narrow road 50 where the face-to-face passage is impossible. If the delivery robot 20A,20C arrives at one side and the other side of the narrow passage 50 at the same time, the problem arises which of the delivery robot 20A,20C passes through the narrow passage 50 first.

In the delivery system 100, an arbitration function for solving the problems described above is provided to the delivery management server 32. The arbitration function is a function for the delivery management server 32 to determine the order in which each delivery robot 20 passes through the bottleneck section when the number of delivery robots 20 gathered in the bottleneck section is larger than the number of delivery robots 20 capable of passing through the bottleneck section at the same time. Hereinafter, the arbitration of the passage order between the delivery robots 20 in the bottleneck section by the delivery management server 32 will be described.

1-3. Arbitration of Passage Order in Bottleneck Section

The delivery management server 32 refers to a delivery priority level of the package 60 that the delivery robot 20 is delivering, when determining the order in which the delivery robot 20 passes through the bottleneck section. The delivery priority level is a value that indicates a level to which the package should be delivered in preference to other packages.

The memory 32b of the delivery management server 32 stores a table (delivery priority level management table) as shown in FIG. 5. In the delivery priority level management table, the ID number of the delivery robot 20 is associated with the delivery priority level of the package 60 being delivered. The delivery priority level is expressed as an integer from 1 to 10, for example, and the higher the value, the higher the delivery priority level. In addition, the delivery robot 20, whose delivery priority level is zero, which is an invalid value, is not delivering a package. The delivery robot 20 not delivering a package includes, for example, the delivery robot 20 having completed the delivery of a package, the delivery robot 20 being on the way to receive a package, and the delivery robot 20 being on standby.

Parameters for determining the delivery priority level may include, for example, the following (1) to (7).

(1) Residence Time of Delivery Robot in Bottleneck Section

For example, as the delivery robot 20 stays longer in the bottleneck section, the delivery priority level is set higher. Thus, it is possible to suppress the occurrence of a situation in which one delivery robot 20 stays long in the bottleneck section.

(2) Content of Package being Delivered

The delivery priority level is determined according to the content of the package being delivered. For example, packages with higher delivery priority levels include:

Items requiring temperature control (e.g., refrigerated products, frozen products)

Dishes and drinks

Dishes and drinks that need to be delivered while they are warm (e.g., pizza, ramen noodles, coffee)

Dishes and drinks that need to be delivered before they begin to melt (e.g., ice coffee, shaved ice)

Something of high financial value (e.g., gold bullion, jewelry, cash, securities)

Something with specified delivery time (e.g., coffee at the meeting, gifts at the birthday party)

In addition, the followings are examples of which the article values of the packages depend on delivery time. Therefore, for the following examples, it is preferable to increase the delivery priority level with time.

Ramen noodles and soba noodles, etc. which would become poor when stretched

Sushi, etc., which would become bad when the freshness decreases

Ice coffee, shaved ice, etc., which would lose value when melted

On the other hand, the following are the packages for which the delivery priority level is not high.

Items not affected by time (e.g., sundry products such as detergents, magazines, newspapers)

Something of low financial value (e.g., sundry sunny goods such as detergents, magazines, newspapers)

Incidentally, when the package is food, the delivery priority level may be changed according to the season, or the delivery priority level may be changed according to the outside air temperature.

(3) Remaining Time to Reserved Delivery Time

If the delivery time of the package is reserved, the higher the delivery priority level is as the time remaining until the reserved delivery time becomes shorter. Thus, it is possible to suppress the occurrence of a situation in which the delivery of the package is delayed with respect to the reserved delivery time.

(4) Scheduled Stay Period of Resident in Destination

When the scheduled stay period of the resident in the destination can be expected, for example, the delivery priority level is lowered as the expected arrival time of the delivery robot 20 to the destination is closer to the beginning of the scheduled stay period, and is raised as the expected arrival time approaches the end of the expected stay period. This makes it possible to deliver the package within the period in which the resident stays at the destination. Incidentally, the scheduled stay period may be entered by the user himself/herself at the time of ordering, may be acquired from the schedule on the cloud that the user normally uses, and may be learned from the user's normal behavior pattern by AI.

(5) Scheduled Return Home Time of Resident in Destination

When the scheduled return home time of the resident in the destination can be expected, for example, the delivery priority level is lowered as the margin time to the scheduled return home time is longer, and is raised as the margin time becomes shorter. This makes it possible to deliver the package matching the time when the resident returns to the destination. If the user wishes to receive the package at the parking lot when returning home, the scheduled time at which the car arrives at the parking lot may be set as the scheduled return home time. Incidentally, the scheduled return home time may be entered by the user himself/herself at the time of ordering, may be acquired from the schedule on the cloud that the user normally uses, and may be learned from the user's normal behavior pattern by AI. Further, GPS information of a mobile phone and gate ID passing information (information such as the user has left workplace, the user has passed through the entrance gate of the town, and the car has passed through the parking gate) may be used to estimate the scheduled return home time.

(6) Elapsed Time from Departure of Delivery Robot from Delivery Source

For example, the longer the elapsed time from departure of the delivery robot from the delivery source, the higher the delivery priority level may be set. This makes it possible to suppress the occurrence of a situation in which a long period of time has elapsed since the package was dispatched, and the package further wastes time in the bottleneck section.

(7) Elapsed Time from Order from Resident in Destination

For example, the longer the elapsed time from the order, the higher the delivery priority level may be set. This makes it possible to suppress an increase in dissatisfaction of the resident who ordered delivery of the package due to an increase in waiting time. If the elapsed time from the order exceeds a predetermined allowable time, the delivery priority level may be increased in accordance with an increase in the elapsed time.

The delivery management server 32 comprehensively determines the delivery priority level based on the respective parameters (1) to (7) described above. For example, the delivery management server 32 calculates the delivery priority level using the equation exemplified below. In Equation 1 below, $X1, X2, \ldots, X7$ are exemplified parameters (1) to (7). Each parameter (1) to (7) is represented by an integer from 1 to 10. The higher the value, the higher the delivery priority level. In addition, $c1, c2, \ldots, c7$ is a weighting factor. The weighting factor is set to a larger value as the parameter is important in determining the delivery priority level. In addition, the weighting factor is set so that the maximum value of the delivery priority level becomes 10. The value obtained by rounding off the first decimal point of the calculation result according to Equation 1 below is determined as the delivery priority level of the target package.

$$\text{Delivery priority level} = c1 \times X1 + c2 \times X2 + \ldots + c7 \times X7 \quad \text{(Equation 1)}$$

Next, a specific example of arbitration of the passage order in the bottleneck section by the delivery management server 32 will be described with reference to FIGS. 6A, 6B and FIGS. 7A, 7B.

Figure 6A:
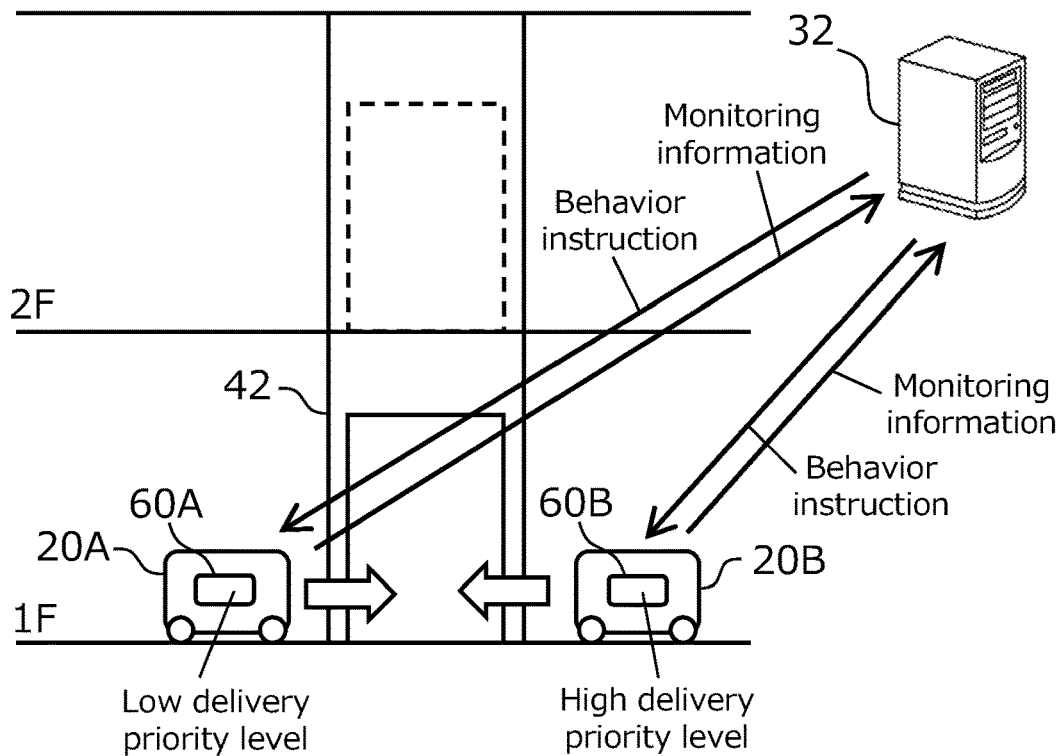
FIG. 6A and FIG. 6B are diagrams illustrating a specific example of arbitration of the passage order in a bottleneck section by the delivery management server.

FIG. 6A shows an example in which two delivery robots 20A, 20B arrived at almost the same time at the entrance of the elevator 42, which is a bottleneck section. The delivery management server 32 confirms that the delivery robots 20A, 20B are gathered at the entrance of the elevator 42 based on the monitoring information transmitted from the delivery robots 20A, 20B. In this case, the delivery management server 32 determines that the arbitration of the order of riding the elevator 42 is required, and compares the delivery priority levels of the packages 60A, 60B delivered by the respective delivery robots 20A, 20B by referring to the delivery priority level management table. Then, the delivery management server 32 instructs to each of the delivery robots 20A, 20B how they should behave based on the comparison.

Figure 6B:
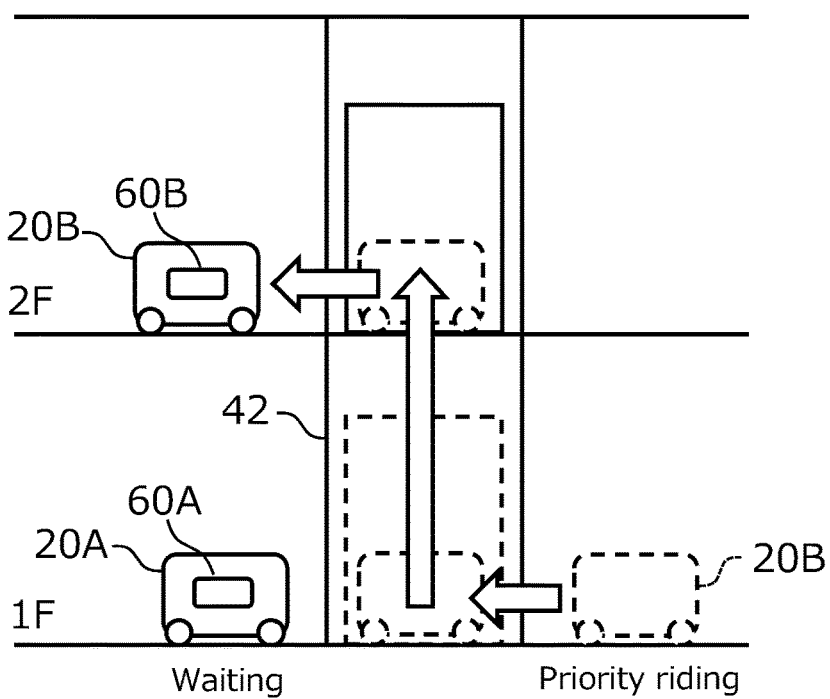

Here, it is assumed that the delivery priority level of the package 60B is higher than the delivery priority level of the package 60A. In this case, as shown in FIG. 6B, the delivery management server 32 instructs the delivery robot 20A to wait and instructs the delivery robot 20B to ride the elevator 42. In other words, the delivery robot 20B is caused to preferentially ride the elevator 42. Then, after the delivery robot 20B is carried by the elevator 42, the delivery management server 32 instructs the delivery robot 20A to ride the elevator 42.

Figure 7A:
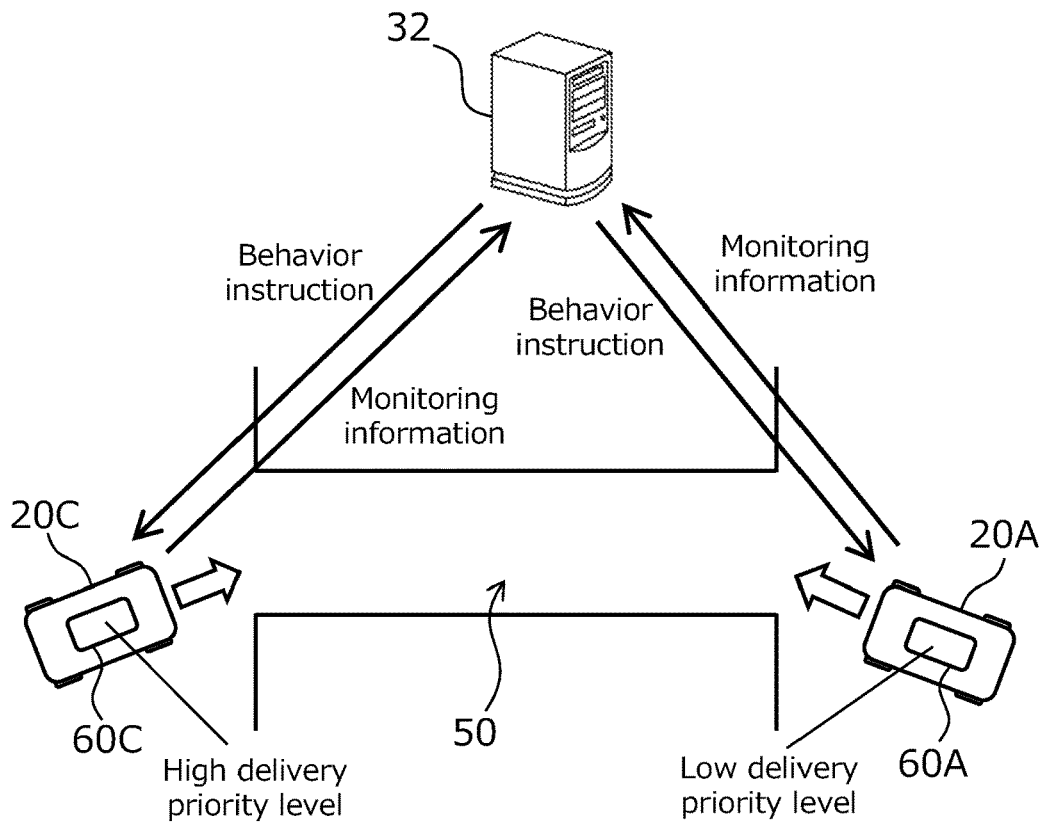
FIG. 7A and FIG. 7B are diagrams illustrating a specific example of arbitration of the passage order in a bottleneck section by the delivery management server.

FIG. 7A shows an example in which the delivery robot 20A arrives at one side of the narrow passage 50, which is a bottleneck section, and the delivery robot 20C arrives at the other side of the narrow road 50 at almost the same time. The delivery management server 32 confirms that the delivery robots 20A, 20C are gathered at both ends of the narrow passage 50 based on the monitoring information transmitted from the delivery robots 20A, 20C. In this case, the delivery management server 32 determines that the arbitration of the order of passing through the narrow passage 50 is required, and compares the delivery priority levels of the packages 60A, 60C delivered by the respective delivery robots 20A, 20C by referring to the delivery priority level management table. Then, the delivery management server 32 instructs to each of the delivery robots 20A, 20C how they should behave based on the comparison.

Figure 7B:
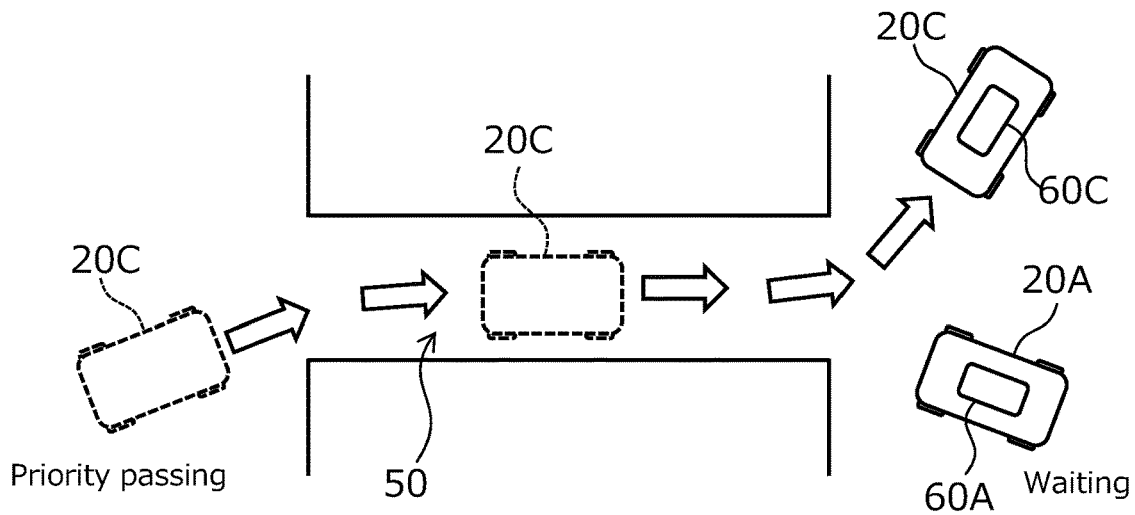

Here, it is assumed that the delivery priority level of the package 60C is higher than the delivery priority level of the package 60A. In this case, as shown in FIG. 7B, the delivery management server 32 instructs the delivery robot 20A to wait and instructs the delivery robot 20C to pass through the narrow passage 50. In other words, the delivery robot 20C is caused to preferentially pass through the narrow passage 50. Then, after the delivery robot 20C passes through the narrow passage 50, the delivery management server 32 instructs the delivery robot 20A to pass through the narrow passage 50.

The bottleneck section may include a shaft in which the delivery robot 20 moves up and down by itself, or a narrow entrance or gate in which a plurality of delivery robots 20 cannot enter and exit at the same time, in addition to the above-mentioned exemplary sections.

Note that there is a case where there is no difference in the delivery priority level of the package being delivered between the delivery robots 20 gathered in the bottleneck section. In this case, the delivery management server 32 requests remote assistance from the operator 36 to determine the order of passing through the bottleneck section. Upon receiving a request for remote support, the operator 36 determines, for the delivery robots 20, the order of passing through the bottleneck section by remote assistance. This prevents the delivery robot 20 from freezing and failing to operate in front of the bottleneck section.

1-4. Processing Flow Between Delivery Robot and Delivery Management Server

Here, a processing flow between a plurality of delivery robots gathered in a bottleneck section and the delivery management server in the delivery system according to the first embodiment will be described with reference to FIG. 8. This sequence diagram also represents a delivery method according to the first embodiment of the present disclosure.

Figure 8:
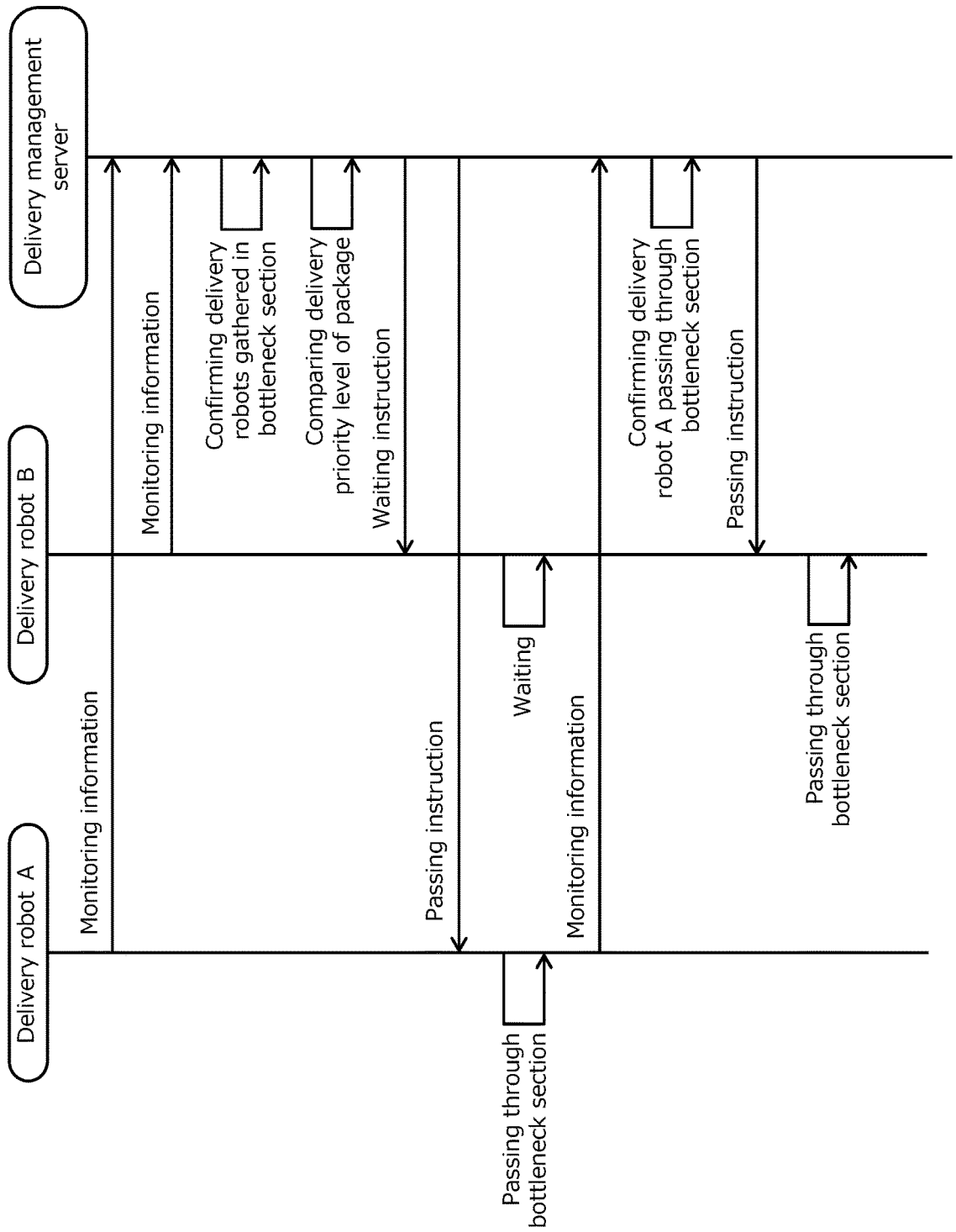
FIG. 8 is a sequence diagram illustrating a flow of processing between delivery robots gathered in a bottleneck section and a delivery management server in a delivery system according to the first embodiment of the present disclosure.

In the example shown in FIG. 8, the delivery management server acquires monitoring information from each of the delivery robot A and the delivery robot B. The delivery management server confirms that the delivery robots A, B are gathered in the bottleneck section based on the monitoring information from each of the delivery robots A, B. Then, the delivery priority levels of the packages being delivered by the delivery robots A, B are compared. In the example shown in FIG. 8, it is assumed that the delivery priority level of the package of the delivery robot A is determined to be higher than the delivery priority level of the package of the delivery robot B.

The delivery management server transmits a waiting instruction to the delivery robot B and transmits a passing instruction to the delivery robot A. Upon receiving the waiting instruction, the delivery robot B waits on the spot. During the delivery robot B waiting, the delivery robot A, which received the passing instruction, passes through the bottleneck section.

The delivery management server confirms that the delivery robot A has passed through the bottleneck section from the monitoring information acquired from the delivery robot A. The delivery management server transmits a passing instruction to the delivery robot B. Upon receiving the passing instruction, the delivery robot B passes through the bottleneck section.

As is apparent from the above description, according to the delivery system according to the first embodiment, it is possible to cause the delivery robot delivering the package having higher delivery priority level to preferentially pass through the bottleneck section. As a result, a disadvantage caused by a delay in delivery can be reduced while controlling traffic in the bottleneck section.

2. Second Embodiment

Next, a delivery system according to a second embodiment of the present disclosure will be described. The second embodiment is characterized in that each delivery robot stores a delivery priority level of a package in the memory thereof and discusses the passage order with other delivery robots in a bottleneck section. Hereinafter, a processing flow between a plurality of delivery robots gathered in a bottleneck section in the delivery system according to the second embodiment will be described with reference to FIG. 9.

Figure 9:
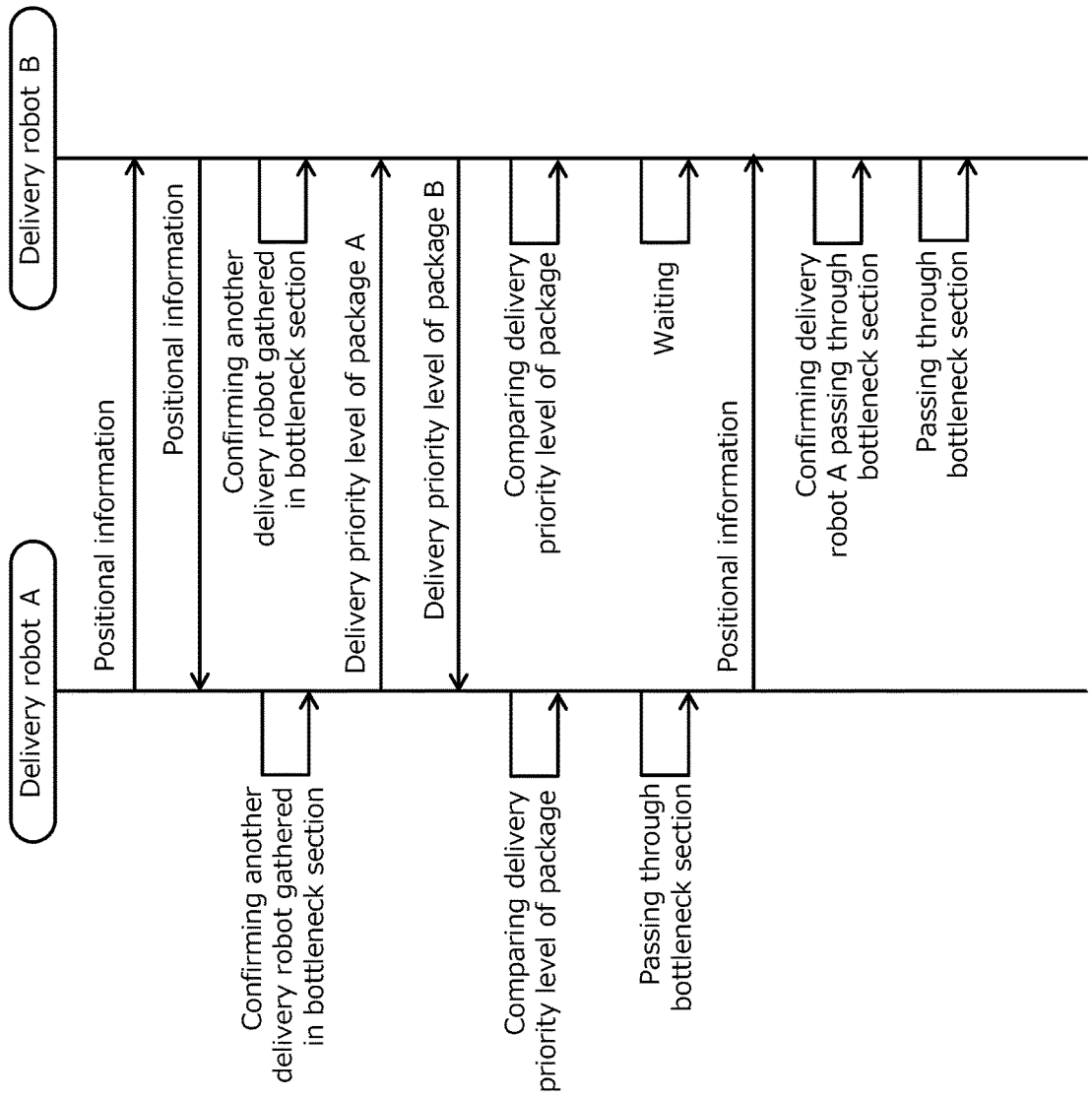
FIG. 9 is a sequence diagram illustrating a flow of processing between delivery robots gathered in a bottleneck section in a delivery system according to a second embodiment of the present disclosure.

In the example shown in FIG. 9, the delivery robot A and the delivery robot B exchange positional information to each other using vehicle-to-vehicle communication. Based on the exchanged positional information, the delivery robot A confirms the existence of the delivery robot B gathered in the bottleneck section, and the delivery robot B confirms the existence of the delivery robot A gathered in the bottleneck section. Then, the delivery robot A transmits the delivery priority level of the package A being delivered by the delivery robot A to the delivery robot B, and the delivery robot B transmits the delivery priority level of the package B being delivered by the delivery robot B to the delivery robot A.

The delivery robots A, B compare the delivery priority levels of the packages A, B. In the example shown in FIG. 9, it is assumed that the delivery priority level of the package of the delivery robot A is determined to be higher than the delivery priority level of the package of the delivery robot B.

The delivery robot B waits on the current spot because the delivery priority level of the package B is determined to be lower than the delivery priority level of the package A. On the other hand, the delivery robot A passes through the bottleneck section while the delivery robot B is waiting because the delivery priority level of the package A is determined to be higher than the delivery priority level of the package B.

The delivery robot B confirms from the positional information acquired from the delivery robot A that the delivery robot A has passed through the bottleneck section. After the confirmation, the delivery robot B passes through the bottleneck section.

As is apparent from the above description, according to the delivery system according to the second embodiment, similarly to the first embodiment, it is possible to cause the delivery robot delivering the package having higher delivery priority level to preferentially pass through the bottleneck section. As a result, a disadvantage caused by a delay in delivery can be reduced while controlling traffic in the bottleneck section.

3. Other Embodiments

When a high priority package is delivered, a resident who is a receiver of the package may be informed of the delivery. By doing so, the resident can be prompted to stay home, and the certainty of delivery of the package can be increased.

In addition, when an elevator for human use and an elevator for cargo exist separately in a building such as a condominium, it is desirable that the delivery robot 20 uses the elevator for cargo. However, if the delivery priority level of the package 60 being delivered by the delivery robot 20 is high, using the elevator for human use may be permitted.

The delivery robot 20 may be equipped with a function to be connected to the operator 36 in an emergency to receive remote assistance by the operator 36. In this case, the delivery robot 20 delivering a package with a high delivery priority level may be connected to the operator 36 preferentially.

A light of variable color may be provided to the delivery robot 20 to change the color of the light depending on the priority of the package being delivered. This makes it possible to urge attention to people around the delivery robot 20.

What is claimed is:

1. A delivery method implemented by one or more hardware processors, the delivery method comprising:
controlling mobile bodies to deliver, by traveling autonomously, packages to designated destinations, each of the packages having a delivery priority level, and the mobile bodies are ground vehicles;
determining whether a number of the mobile bodies gathered in a bottleneck section is larger than a number of the mobile bodies capable of passing through the bottleneck section at a same time, and
when it is determined that the number of the mobile bodies gathered in the bottleneck section is larger than the number of the mobile bodies capable of passing through the bottleneck section at the same time, preferentially controlling, of the mobile bodies and the packages, a mobile body delivering a package of which the delivery priority level is higher than a package delivered by another mobile body to pass through the bottleneck section.

2. The delivery method according to claim 1, further comprising changing the delivery priority level of a package depending on a residence time of a mobile body delivering the package in the bottleneck section.

3. The delivery method according to claim 1, further comprising changing the delivery priority level of a package over time depending on a content of the package.

4. The delivery method according to claim 1, further comprising changing the delivery priority level of a package depending on a time remaining until a reserved delivery time of the package.

5. The delivery method according to claim 1, further comprising changing the delivery priority level of a package depending on a scheduled stay period of a resident in a destination to which the package is delivered.

6. The delivery method according to claim 1, further comprising changing the delivery priority level of a package depending on a scheduled return home time of a resident in a destination to which the package is delivered.

7. The delivery method according to claim 1, further comprising changing the delivery priority level of a package depending on an elapsed time from departure of a mobile body delivering the package from a delivery source.

8. The delivery method according to claim 1, further comprising changing the delivery priority level of a package depending on an elapsed time from an order from a resident in a destination to which the package is delivered.

9. The delivery method according to claim 1, further comprising, when there is no difference in delivery priority levels of packages among the mobile bodies gathered in the bottleneck section, requesting remote assistance from an operator to determine an order of passing through the bottleneck section.

10. The delivery method of claim 1, wherein the bottleneck section is a section of a street.

11. A delivery management server connected via a communication network to a plurality of mobile bodies traveling autonomously and delivering packages to designated destinations, the delivery management server comprising:
one or more memories storing a delivery priority level of each of the packages; and
one or more processors configured to:
control the mobile bodies to deliver, by traveling autonomously, the packages to the designated destinations, each of the packages having a delivery priority level, and the mobile bodies are ground vehicles
determine whether a number of the mobile bodies gathered in the bottleneck section is larger than a number of the mobile bodies capable of passing through the bottleneck section at a same time; and
when it is determined that the number of mobile bodies gathered in the bottleneck section is larger than the number of mobile bodies capable of passing through the bottleneck section at the same time, preferentially controlling, of the mobile bodies and the packages, a mobile body delivering a package of which the delivery priority level is higher than a package delivered by another mobile body to pass through the bottleneck section.

12. The delivery management server according to claim 11, wherein the one or more processors are configured further to change the delivery priority level of a package depending on a residence time of a mobile body delivering the package in the bottleneck section.

13. The delivery management server according to claim 11, wherein the one or more processors are configured further to change the delivery priority level of a package over time depending on a content of the package.

14. The delivery management server according to claim 11, wherein the one or more processors are configured further to change the delivery priority level of a package depending on a time remaining until a reserved delivery time of the package.

15. The delivery management server according to claim 11, wherein the one or more processors are configured further to change the delivery priority level of a package depending on a scheduled stay period of a resident in a destination to which the package is delivered.

16. The delivery management server according to claim 11, wherein the one or more processors are configured further to change the delivery priority level of a package depending on a scheduled return home time of a resident in a destination to which the package is delivered.

17. The delivery management server according to claim 11, wherein the one or more processors are configured further to change the delivery priority level of a package depending on an elapsed time from departure of a mobile body delivering the package from a delivery source.

18. The delivery management server according to claim 11, wherein the one or more processors are configured further to change the delivery priority level of a package depending on an elapsed time from an order from a resident in a destination to which the package is delivered.

19. The delivery management server according to claim 11, wherein the one or more processors are configured further to, when there is no difference in delivery priority levels of packages among the mobile bodies gathered in the bottleneck section, requesting remote assistance from an operator to determine an order of passing through the bottleneck section.

20. A mobile body configured to travel autonomously and deliver a package to a designated destination, the mobile body comprising:
   a memory storing a delivery priority level of the package; and
   a processor configured to:
      control the mobile body to deliver, by traveling autonomously, the package to the designated destination, the package having a delivery priority level, and the mobile body is a ground vehicle;
      determining whether a number of mobile bodies, including the mobile body, gathered in a bottleneck section is larger than a number of the mobile bodies capable of passing through the bottleneck section at a same time; and
      when it is determined that the number of the mobile bodies gathered in the bottleneck section is larger than the number of the mobile bodies capable of passing through the bottleneck section at the same time:
         compare the priority level of the package between the mobile bodies gathered in the bottleneck section; and
         cause the mobile body to pass through the bottleneck section prior to one or more other mobile bodies delivering packages having lower priority levels than the mobile body after one or more other mobile bodies delivering packages having higher priority levels than the mobile body have passed the bottleneck section.

* * * * *